Figure 1:
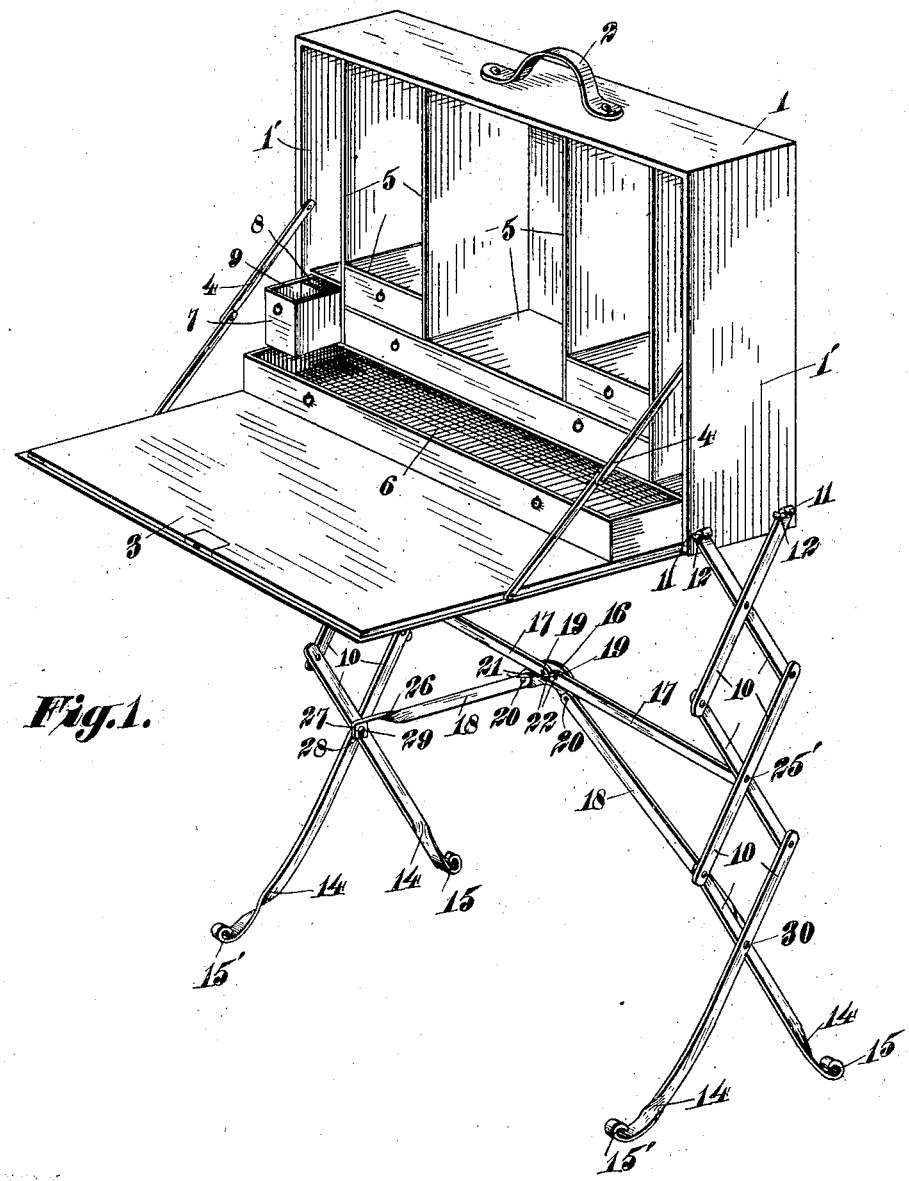

No. 893,694. PATENTED JULY 21, 1908.
J. O. G. ALLENSON
PORTABLE DESK.
APPLICATION FILED APR. 21, 1908.
2 SHEETS—SHEET 2.
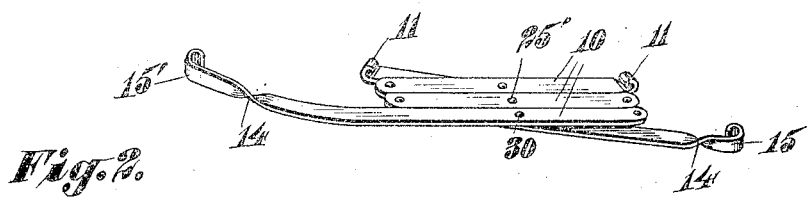
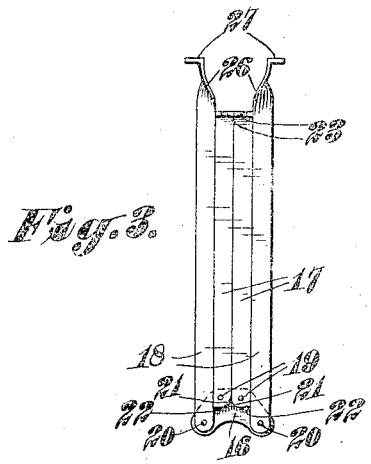
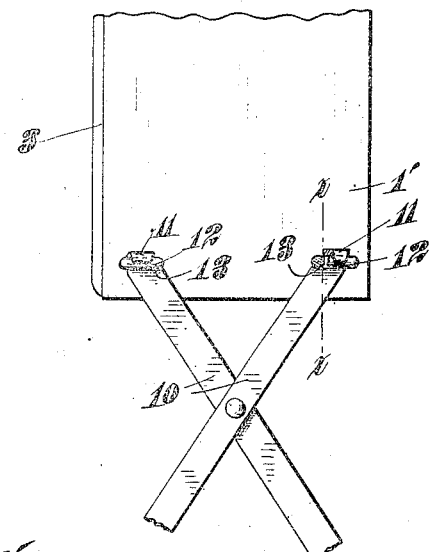
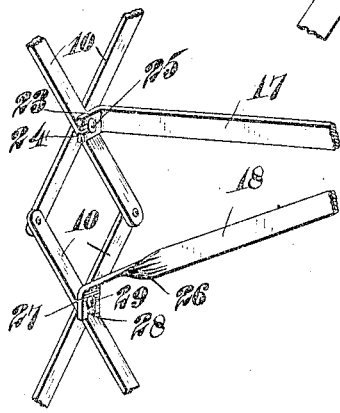
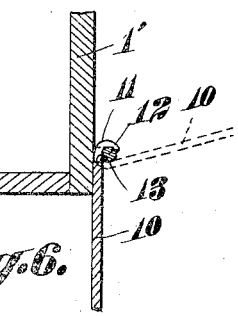
Witnesses:
A. A. Olson
P. J. McAllister
Inventor:
John O. G. Allenson
by Joshua R. H. Potts
Atty.

UNITED STATES PATENT OFFICE.

JOHN O. G. ALLENSON, OF CHICAGO, ILLINOIS.

PORTABLE DESK.

No. 893,694.

Specification of Letters Patent.

Patented July 21, 1908.

Application filed April 21, 1908. Serial No. 428,433.

*To all whom it may concern:*

Be it known that I, JOHN O. G. ALLENSON, a citizen of the United States, residing at Chicago, county of Cook, and State of Illinois, have invented certain new and useful Improvements in Portable Desks, of which the following is a specification.

My invention relates to desks and particularly to portable desks.

The object of my invention is to provide a portable writing desk which will occupy but little space when folded.

A further object of my invention is to provide a writing desk, the body portion of which, shall present the appearance similar to that of a suitcase when folded, the legs being detachable and collapsible and said body portion being provided with a receptacle for said legs when in folded position.

Other objects will appear hereinafter.

My invention will be more readily understood by reference to the accompanying drawings forming a part of this specification, and in which;

Figure 1 is a perspective view of a desk embodying my invention illustrating the same set up for use, Fig. 2 is a perspective view of one of the leg members detached and folded, Fig. 3 is a plan view of the leg brace member in folded position, Fig. 4 is a perspective view illustrating the manner of connecting the legs and leg braces, Fig. 5 is a side elevation of the lower portion of the body, and the upper portion of a leg member illustrating the manner of connecting the same, and Fig. 6 is a detail section on substantially the line $x$—$x$ of Fig. 5 illustrating the manner of disconnecting the legs from the body portion.

Referring now to the drawings, 1 indicates the body portion of the desk which is preferably a rectangular box-like member of suitable size and shape to be readily carried when in folded position, a handle 2 being provided on its upper face. One side of the box-like member is hingedly connected at the bottom, and is adapted to swing outwardly into a horizontal position forming the writing bed 3 which is supported in open position by the jointed braces 4, which fold within the body portion as the side 3 is raised to close the desk. The body portion is provided with or divided by a plurality of partitions 5 into a number of compartments, some of which are provided with drawers for stationery, bottles of ink and like accessories. The lower drawer 6 preferably extends the full width of the desk, and is adapted to hold the legs and leg braces when detached and folded. A small drawer 7 is provided at one side of the desk which is divided by a partition 8 forming a compartment 9 for a bottle of ink.

The leg members are formed of a plurality of bars 10, connected on the lazy-tong principle and detachably connected to the body portion 1 at or near the bottom of the end members 1'. The legs preferably are made of aluminum to reduce the weight. Upon the upper ends of the top bars 10, are formed hooks 11 which engage loops or eyes 12 secured to the end members 1'. The hooks 11 are narrower than the bars 10 forming shoulders 13 upon which the eyes 12 rest forming a firm support for the desk, the eyes being of a width to accommodate the reduced hook portions with a snug fit. It should be noted that the eyes 12 prevent the legs from collapsing. To detach the legs they are swung outwardly as shown in dotted lines in Fig. 6. The bottom bars 10 are twisted as at 14 near their lower ends, and then curled to form feet 15 and 15', the latter being the front feet are somewhat extended to form a better support for the desk when in opened position.

The leg braces are detachably connected to the legs and preferably comprise a central plate 16, having a pair of arms 17 and a pair of arms 18 pivotally connected thereto. The arms 17 are pivotally connected to the plate as at 19 above the pivot points 20 of the arms 18 and close together so that when the arms are in folded position, they lie close together and parallel. The adjacent corners are rounded as at 21 to permit the arms 17 to swing freely open while the outer corners 22 are formed square, and constitute stops to limit the outward swing of the arms by abutting against each other, as shown in Fig. 1. The pivot points 20 of the arms 18 are spaced apart so that the said arms will fold against the arms 17 when in collapsed position as shown in Fig. 3. The ends of the arms 17 are turned outwardly forming lugs 23 which are slotted as at 24 to receive the headed stud 25 formed upon one of the pivotal connections 25' of the bars 10, and the ends of the arms 18 are first bent as at 26 and then turned outwardly and slotted forming the slotted lug 27 extending at right angles to the lugs 23, 28 indicating the slot which receives a stud 29 formed upon the pivotal connection 30 between the lower bars 10 of the leg members. After the legs have been extended and attached to the body portion, the slots 28 are engaged with the studs 29 and the brace is swung until the slots 24 engage the studs 25 locking the device into a firm and rigid structure. To fold the desk the brace is first detached by disengaging the same from the studs. The leg members are then swung outwardly and detached, and the several members are folded into the position shown in Figs. 2 and 3, after which they are placed in the drawer 6, the body portion is then closed forming a neat, compact case which may be readily carried or set aside occupying but small space.

Having described my invention what I claim as new, and desire to secure by Letters Patent, is:

1. A portable desk comprising a rectangular box-like body provided on its upper face with a handle and having a hinged side, in combination with a pair of foldable leg members detachably connected thereto, said members being formed of a plurality of bars connected on the lazy-tong principle, and a detachable brace for connecting said leg members, substantially as described.

2. A desk comprising a body portion, in combination with a pair of leg members detachably connected to the ends thereof, each of said leg members comprising a plurality of bars connected on the lazy-tong principle, the upper ends of the top bars being provided with hook portions, eyes on the ends of said body to engage said hook portions, and shoulders formed on said bars adjacent to said hooks, substantially as described.

3. A desk comprising a body portion, in combination with a pair of leg members detachably connected to the ends thereof and a brace detachably connected to said leg members forming a rigid frame, said brace comprising a plate and a plurality of arms pivotally connected thereto, the ends of said arms being provided with slotted lugs and said leg members being provided with studs, substantially as described.

In testimony whereof I have signed my name to this specification in the presence of two subscribing witnesses.

JOHN O. G. ALLENSON.

Witnesses:
  JANET E. HOGAN,
  HELEN F. LILLIS.